(12) United States Patent
Kurokawa

(10) Patent No.: US 10,763,006 B2
(45) Date of Patent: Sep. 1, 2020

(54) ION PROBE

(71) Applicant: TOYOTA JIDOSHA KABUSHIKI KAISHA, Toyota-shi, Aichi-ken (JP)

(72) Inventor: Toshikuni Kurokawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 201 days.

(21) Appl. No.: 16/040,854

(22) Filed: Jul. 20, 2018

(65) Prior Publication Data

US 2019/0051428 A1 Feb. 14, 2019

(30) Foreign Application Priority Data

Aug. 9, 2017 (JP) ................................. 2017-154105

(51) Int. Cl.
| | |
|---|---|
| *G01N 30/68* | (2006.01) |
| *H01B 3/12* | (2006.01) |
| *H01B 3/10* | (2006.01) |
| *G01M 15/10* | (2006.01) |

(52) U.S. Cl.
CPC ............... *H01B 3/12* (2013.01); *H01B 3/105* (2013.01); *G01M 15/10* (2013.01)

(58) Field of Classification Search
CPC ................................ G01M 15/10; G01N 30/68
USPC ........................................................ 73/23.31
See application file for complete search history.

(56) References Cited

U.S. PATENT DOCUMENTS

| | | | | |
|---|---|---|---|---|
| 4,709,155 | A * | 11/1987 | Yamaguchi | ............... G01J 5/02 250/554 |
| 6,148,660 | A * | 11/2000 | Chiu | ..................... F02P 19/028 324/378 |
| 2002/0036192 | A1* | 3/2002 | Sato | ........................ F02P 17/12 219/270 |
| 2002/0134138 | A1* | 9/2002 | Philipp | ................. G01J 5/0803 73/35.07 |
| 2004/0161221 | A1* | 8/2004 | Kashihara | ............... G01K 1/12 385/139 |
| 2017/0025824 | A1* | 1/2017 | Mixell | .................... H01T 13/20 |

(Continued)

FOREIGN PATENT DOCUMENTS

| | | |
|---|---|---|
| CN | 104792408 A | 7/2015 |
| JP | S52-118135 A | 10/1977 |

(Continued)

OTHER PUBLICATIONS

Gang, "Production Quality Inspection of Domestic Washing Machine," China Quality Inspection Press, 1st Edition, Dec. 2011, p. 43.

(Continued)

*Primary Examiner* — Alexander A Mercado
(74) *Attorney, Agent, or Firm* — Oliff PLC

(57) ABSTRACT

An ion probe includes a metal wire, a metal sheath covering the metal wire, insulation powder provided between the metal wire and the metal sheath, and a ceramic capillary. A portion of the metal wire projecting from a distal end of the metal sheath is passed through the ceramic capillary. The ceramic capillary is bonded to the distal end of the metal sheath by an organic adhesive layer. A part of the insulation powder located at the distal end of the metal sheath is covered with the organic adhesive layer.

4 Claims, 8 Drawing Sheets

(56) References Cited

U.S. PATENT DOCUMENTS

2019/0051428 A1* 2/2019 Kurokawa ............... H01B 3/12

FOREIGN PATENT DOCUMENTS

JP          H04-980100 U1 * 8/1992
JP          2007192757 A * 8/2007

OTHER PUBLICATIONS

Nianqing, "Electrical Engineering and Electronic Training," Press of Electric Science and Technology University, 1st Edition, Jan. 2017, p. 17.
Jan. 19, 2020 Office Action issued in Chinese Patent Application No. 201810890798.X.
Kato et al; "Development of Combustion Behavior Analysis Technique in the Ultra High Engine Speed Range;" vol. 3; No. 1; pp. 58-63; May 2008.
T. Nakashima et al.,"Development of Combustion Characteristics Analysis Method on Ultra High Engine Speed Range," JASE Proceedings, Jul. 2006, vol. 37, No. 4, pp. 107-111.
L. Guangyu et al., New Techniques of Adhesion and Sealing, National Defense Industry Press,1st edition, Jan. 2006, pp. 154-156.
Partial English Translation of Jul. 14, 2020 Office Action issued in Chinese Patent Application No. 201810890798.X.

* cited by examiner

COMPARATIVE EXAMPLE

COMPARATIVE EXAMPLE

ION PROBE

INCORPORATION BY REFERENCE

The disclosure of Japanese Patent Application No. 2017-154105 filed on Aug. 9, 2017 including the specification, drawings and abstract is incorporated herein by reference in its entirety.

BACKGROUND

1. Technical Field

The disclosure relates generally to an ion probe, and relates more specifically to an ion probe including a metal wire, a metal sheath covering the metal wire, and insulation powder provided between the metal wire and the metal sheath.

2. Description of Related Art

As described in, for example, "Development of Combustion Behavior Analysis Technique in the Ultra High Engine Speed Range" written by Takehiko Kato et al. (DENSO Corporation) and published in DENSO Technical Review, Vol. 13, No. 1, pp. 58-63 (May, 2008) (hereinafter, simply referred to as "Development of Combustion Behavior Analysis Technique in the Ultra High Engine Speed Range"), ion probes are used to detect the flame propagation behavior in a combustion chamber of an engine. A flame is plasma. Therefore, when a flame reaches a distal end of an ion probe, an ion current flows through the ion probe, whereby the flame is detected. Therefore, as described in "Development of Combustion Behavior Analysis Technique in the Ultra High Engine Speed Range", providing a plurality of ion probes in a combustion chamber makes it possible to detect the flame propagation behavior.

As described in "Development of Combustion Behavior Analysis Technique in the Ultra High Engine Speed Range", in general, an ion probe is configured such that an insulation layer is provided between a metal wire having a distal end to be exposed to flames and a metal sheath covering the metal wire. The insulation layer is usually made of insulation powder.

SUMMARY

The inventor et al. have found the following issues related to ion probes. Insulation powder provided between a metal wire and a metal sheath absorbs moisture generated in a combustion chamber. Hence, repeated flame detection, that is, repeated use of an ion probe, reduces the insulation resistance between the metal wire and the metal sheath, resulting in reduction in the accuracy of flame detection.

In "Development of Combustion Behavior Analysis Technique in the Ultra High Engine Speed Range", the insulation layer made of insulation powder is covered with a ceramic adhesive layer provided at a distal end of the ion probe, which is exposed to flames. However, the ceramic adhesive layer is porous, and thus moisture permeates through the ceramic adhesive layer. The insulation powder then absorbs the moisture, and therefore the foregoing issues cannot be effectively resolved. On the other hand, when an organic adhesive layer is used instead of a ceramic adhesive layer, burnout of the organic adhesive layer due to flames or deterioration of the organic adhesive layer due to heat may occur, and therefore the foregoing issues cannot be effectively resolved.

The disclosure provides an ion probe configured to restrain reduction in the insulation resistance between a metal wire and a metal sheath due to repeated use of the ion probe.

An aspect of the disclosure relates to an ion probe including: a metal wire; a metal sheath covering the metal wire; insulation powder provided between the metal wire and the metal sheath; and a ceramic capillary through which a portion of the metal wire projecting from a distal end of the metal sheath is passed. The ceramic capillary is bonded to the distal end of the metal sheath by an organic adhesive layer. A part of the insulation powder located at the distal end of the metal sheath is covered with the organic adhesive layer.

In the ion probe according to the above aspect of the disclosure, the ceramic capillary through which the portion of the metal wire projecting from the distal end of the metal sheath is passed is bonded to the distal end of the metal sheath by the organic adhesive layer. Thus, the organic adhesive layer is covered with the ceramic capillary. Therefore, even if the ion probe is repeatedly used, burnout of the organic adhesive layer due to flames and deterioration of the organic adhesive layer due to heat can be restrained. In addition, in the ion probe according to the above aspect of the disclosure, a part of the insulation powder located at the distal end of the metal sheath is covered with the organic adhesive layer. Thus, it is possible to restrain moisture from being absorbed into the insulation powder. That is, it is possible to restrain reduction in the insulation resistance between the metal wire and the metal sheath due to repeated use of the ion probe.

In the above aspect, an outer diameter of the ceramic capillary and an outer diameter of the metal sheath may be equal to each other. The feature that the outer diameter of the ceramic capillary and the outer diameter of the metal sheath are equal to each other includes not only a state where the outer diameter of the ceramic capillary and the outer diameter of the metal sheath are precisely equal to each other but also a state where the outer diameter of the ceramic capillary and the outer diameter of the metal sheath are substantially equal to each other. In this case, the state where the outer diameter of the ceramic capillary and the outer diameter of the metal sheath are substantially equal to each other can be regarded as the state where the outer diameter of the ceramic capillary and the outer diameter of the metal sheath are equal to each other, based on the technical knowledge in this technical field. With this configuration, it is possible to facilitate the assembly of the ion probe to a flame detection target member.

In the above aspect, the insulation powder may contain magnesium oxide powder. With this configuration, it is possible to increase the insulation resistance between the metal wire and the metal sheath.

In the above aspect, the portion of the metal wire projecting from the distal end of the metal sheath may be passed through a through-hole of the ceramic capillary. The through-hole may have an increased-diameter portion having a diameter that is increased toward a butt surface of the ceramic capillary, which butts against the distal end of the metal sheath. The organic adhesive layer may be disposed in the increased diameter portion.

The disclosure provides the ion probe configured to restrain reduction in the insulation resistance between the metal wire and the metal sheath due to repeated use of the ion probe.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an example embodiment of the disclosure will be described in detail with reference to the accompanying drawings. Note that the disclosure is not limited to the following example embodiment. For the sake of clear understanding, the following description and the drawings will be provided in an appropriately simplified manner.

Example Embodiment

Configuration of Flame Detecting System

Figure 1:
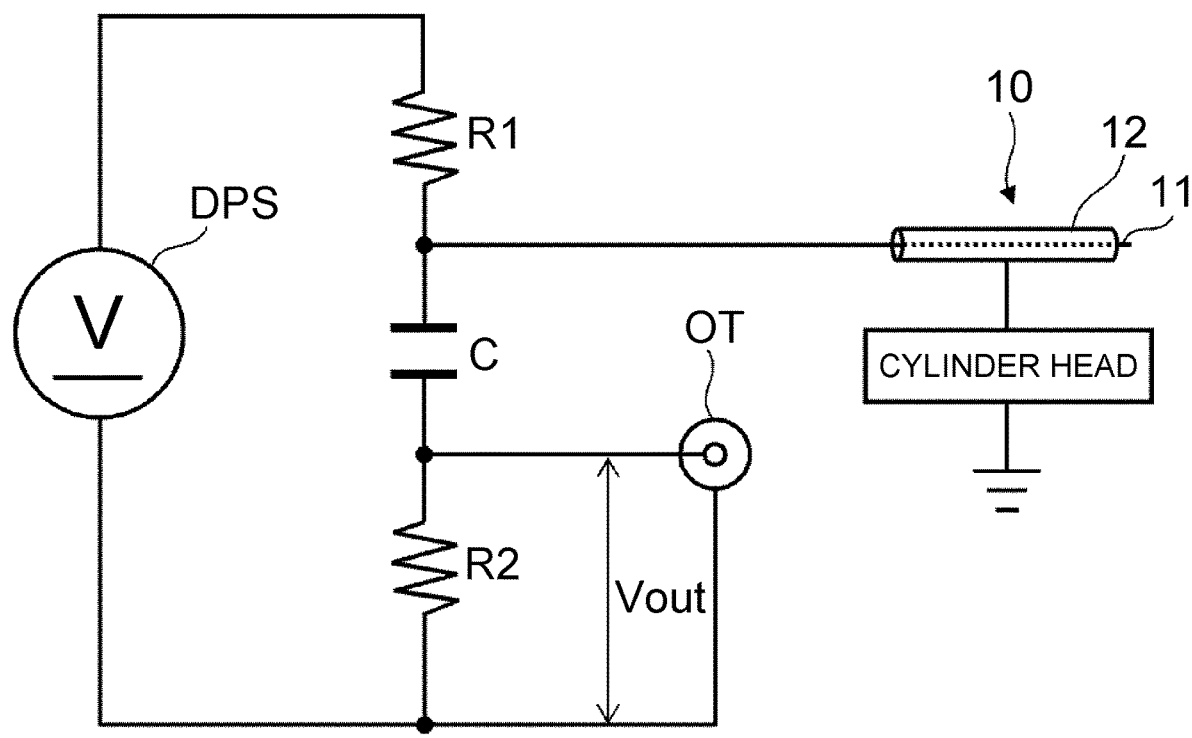
FIG. 1 is a circuit diagram of a flame detecting system including ion probes according to an embodiment.

First, a flame detecting system including ion probes according to an example embodiment will be described with reference to FIG. 1. FIG. 1 is a circuit diagram of the flame detecting system including the ion probes according to the present embodiment. The flame detecting system illustrated in FIG. 1 is used to detect a flame in a combustion chamber CC of an engine. As illustrated in FIG. 1, the flame detecting system includes ion probes 10, a direct-current (DC) power source DPS, a resistor R1, a resistor R2, a capacitor C, and an output terminal OT.

As illustrated in FIG. 1, a first end of the DC power source DPS is connected to a first end of the capacitor C via the resistor R1. Further, a second end of the DC power source DPS is connected to a second end of the capacitor C via the resistor R2. That is, the resistor R1, the capacitor C, and the resistor R2 are connected in series between both terminals of the DC power source DPS, thereby constituting a closed circuit. Because the capacitor C is connected in series to the DC power source DPS in this manner, normally, no current flows through the closed circuit. Thus, the first end of the capacitor C is at the same electric potential as that at the first end of the DC power source DPS, and the second end of the capacitor C is at the same electric potential as that at the second end of the DC power source DPS.

As illustrated in FIG. 1, the ion probe 10 is connected to the first end of the capacitor C to which the resistor R1 is connected. The ion probe 10 includes a metal wire 11 and a metal sheath 12. The metal wire 11 is connected to the first end of the capacitor C. Hence, a distal end of the metal wire 11 is at the same electric potential as that at the first end of the DC power source DPS. The distal end of the metal wire 11 projects from the metal sheath 12, so that the distal end of the metal wire 11 is exposed to flames. When a flame reaches the distal end of the metal wire 11, an ion current flows through the metal wire 11. Although an output voltage of the DC power source DPS, that is, a voltage applied to the metal wire 11, is not limited to any specific voltages, it may be, for example, approximately 300 V or approximately −300 V.

The metal sheath 12 is a protective tube that covers the metal wire 11. The metal sheath 12 is electrically insulated from the metal wire 11. The metal sheath 12 is inserted into a cylinder head CH so as to be in contact with the cylinder head CH. Hence, as illustrated in FIG. 1, the metal sheath 12 is electrically connected to the cylinder head CH that is grounded. That is, the metal sheath 12 is grounded via the cylinder head CH. The details of the configuration of the ion probe 10 according to the present embodiment will be described later.

As illustrated in FIG. 1, an output voltage Vout, that is, a voltage across both terminals of the resistor R2, is output from the output terminal OT. As described above, normally, no current flows through the resistor R2 and thus the output voltage Vout is 0V. When a flame reaches the distal end of the metal wire 11 and an ion current flows through the metal wire 11, a current temporarily flows also through the resistor R2. As a result, the output voltage Vout temporarily fluctuates, so that a peak appears in the output voltage Vout.

As described above, the flame detecting system illustrated in FIG. 1 can detect a flame, because a peak appears in the output voltage Vout when the flame reaches the distal end of the metal wire 11 of the ion probe 10.

Figure 2:
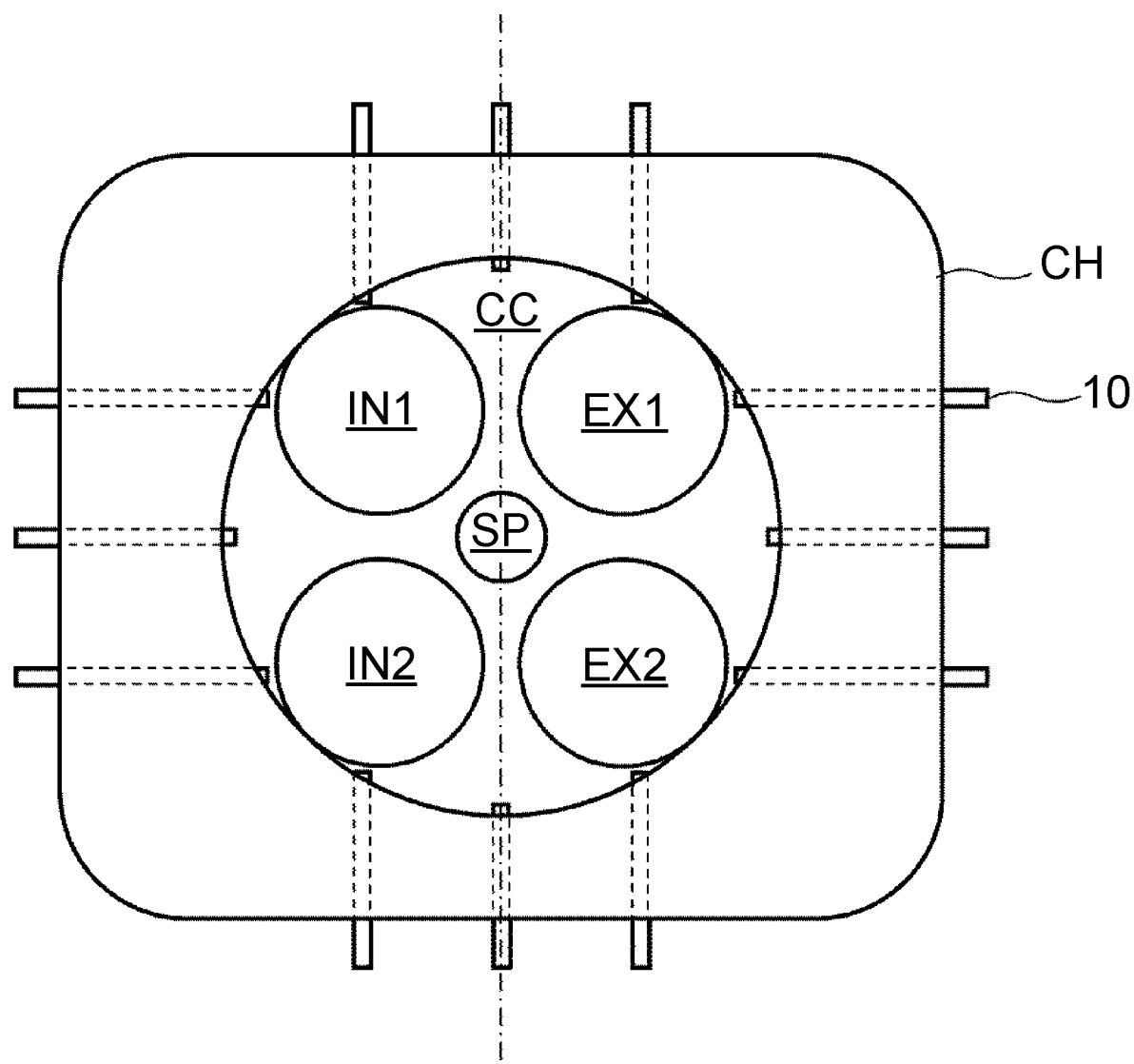
FIG. 2 is a plan view illustrating an example of how ion probes are arranged in a combustion chamber of a cylinder head.

FIG. 2 is a plan view illustrating an example of how the ion probes 10 are arranged in the combustion chamber CC of the cylinder head CH. Specifically, FIG. 2 is a plan view of the cylinder head CH as viewed from its mating surface-side. The mating surface of the cylinder head CH is a surface thereof to be fitted to a cylinder block. As illustrated in FIG. 2, a combustion chamber CC having a circular shape in a plan view is provided at a center portion of the cylinder head CH. The combustion chamber CC is, for example, a pent-roof combustion chamber. In the combustion chamber CC, two intake valves IN1, IN2 and two exhaust valves EX1, EX2 are provided such that the intake valve IN1 and the exhaust valve EX2 are opposed to each other with respect to a central axis of the combustion chamber CC and the intake valve IN2 and the exhaust valve EX1 are opposed to each other with respect to the central axis of the combustion chamber CC. A spark plug SP is provided at the center of the combustion chamber CC. In the example illustrated in FIG. 2, twelve ion probes 10 are disposed such that the distal ends thereof are arranged at equal intervals along the circumference of the combustion chamber CC. Providing a plurality of the ion probes 10 in the combustion chamber CC in this manner makes it possible to detect the flame propagation behavior in the combustion chamber CC.

Configuration of Ion Probe According to Present Embodiment

Figure 3:
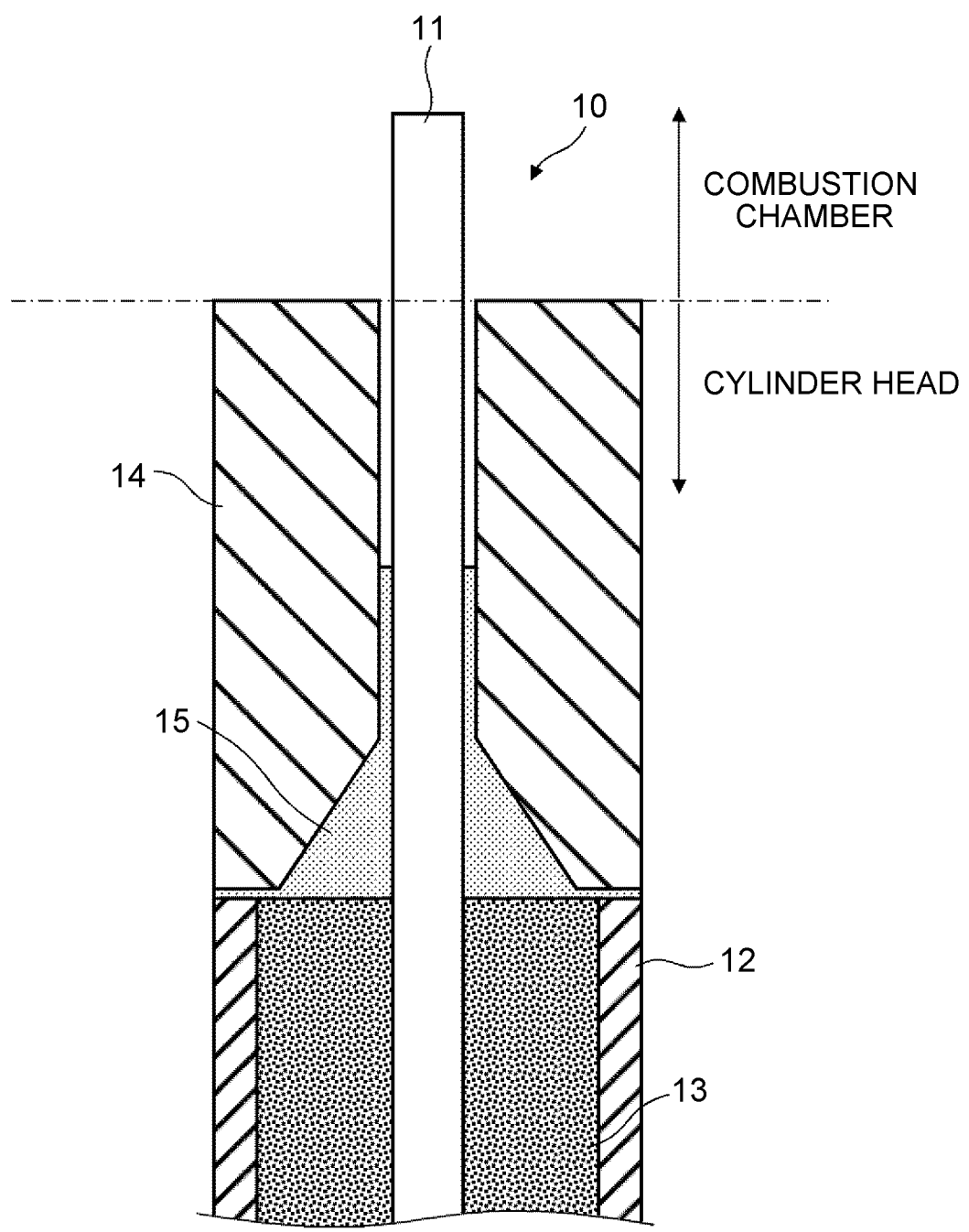
FIG. 3 is a longitudinal sectional view of the ion probe according to the embodiment.

Next, with reference to FIG. 3, the configuration of the ion probe 10 according to the present embodiment will be described in detail. FIG. 3 is a longitudinal sectional view of the ion probe 10 according to the present embodiment. As illustrated in FIG. 3, the ion probe 10 according to the present embodiment includes the metal wire 11, the metal sheath 12, insulation powder 13, a ceramic capillary 14, and an organic adhesive layer 15.

The metal wire 11 is a core wire of the ion probe 10. For example, a nickel-chrome (i.e., nichrome) wire having a diameter of approximately 0.3 mm may be used as the metal wire 11. As illustrated in FIG. 3, the distal end of the metal wire 11 projects from the metal sheath 12 and the ceramic capillary 14, and the distal end of the metal wire 11 is disposed in the combustion chamber CC so as to be exposed to flames when the ion probe 10 is used. When a flame reaches the distal end of the metal wire 11, an ion current flows through the metal wire 11.

The metal sheath 12 is a protective tube that covers the metal wire 11. For example, a metal tube having a diameter of approximately 1 mm may be used as the metal sheath 12. As illustrated in FIG. 3, the metal sheath 12 is inserted into the cylinder head CH when the ion probe 10 is used. The insulation powder 13 is provided between the metal wire 11 and the metal sheath 12 (i.e., a space between the metal wire 11 and the metal sheath 12 is filled with the insulation powder 13), so that the metal sheath 12 and the metal wire 11 are insulated from each other by the insulation powder 13. For example, magnesium oxide (MgO) powder, which has a high resistance and a high electric insulation performance, may be used as the insulation powder 13.

The ceramic capillary 14 is a protective tube made of ceramic. The ceramic capillary 14 covers a portion of the metal wire 11, which projects from a distal end of the metal sheath 12. As illustrated in FIG. 3, the portion of the metal wire 11, which projects from the distal end of the metal sheath 12, is passed through the ceramic capillary 14. In order to make it easier to pass the metal wire 11 through the ceramic capillary 14, the diameter of a through-hole of the ceramic capillary 14 is gradually increased toward a butt surface thereof, which butts against the distal end of the metal sheath 12. That is, the through-hole of the ceramic capillary 14 has an increased-diameter portion having a diameter that is increased toward the butt surface of the ceramic capillary 14. The ceramic capillary 14 is inserted into the cylinder head CH when the ion probe 10 is used. For example, in order to facilitate the assembly of the ceramic capillary 14 and the metal sheath 12 to a flame detection target member, such as the cylinder head CH, the ceramic capillary 14 may preferably have substantially the same diameter as that of the metal sheath 12.

As illustrated in FIG. 3, the ceramic capillary 14 is bonded to the distal end of the metal sheath 12 by an organic adhesive layer 15. In this case, for example, a part of the insulation powder 13 located at the distal end of the metal sheath 12 is covered with the organic adhesive layer 15 having a water-proof property. That is, the part of the insulation powder 13 which is covered with the organic adhesive layer 15 is located at the distal end of the metal sheath 12. Hence, it is possible to restrain moisture generated in the combustion chamber CC from being absorbed into the insulation powder 13. Further, the organic adhesive layer 15 is covered with the ceramic capillary 14. Thus, it is possible to restrain burnout of the organic adhesive layer 15 due to flames and deterioration of the organic adhesive layer 15 due to heat, even if flame detection is repeatedly performed.

Thus, even if flame detection is repeatedly performed, the organic adhesive layer 15 continuously restrains the moisture from being absorbed into the insulation powder 13. That is, it is possible to restrain the reduction in the insulation resistance between the metal wire 11 and the metal sheath 12 due to repeated use of the ion probe 10, thereby restraining the reduction in the accuracy of flame detection.

Configuration of Ion Probe According to Comparative Example

Figure 4:
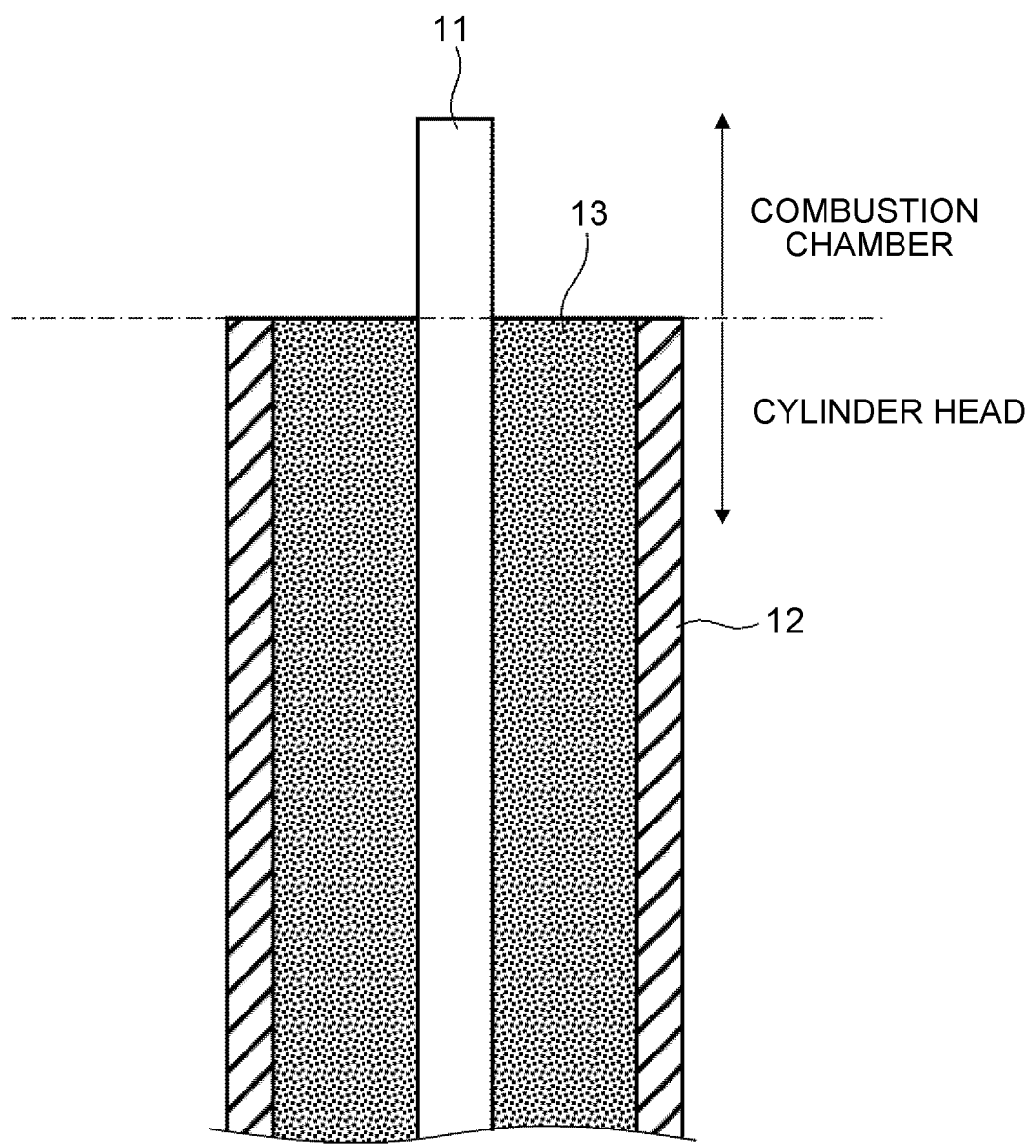
FIG. 4 is a longitudinal sectional view of an ion probe according to a comparative example to be compared with the embodiment.

Next, the configuration of an ion probe according to a comparative example to be compared with the present embodiment will be described with reference to FIG. 4. FIG. 4 is a longitudinal sectional view of the ion probe according to the comparative example to be compared with the present embodiment. As illustrated in FIG. 4, the ion probe according to the comparative example includes the metal wire 11, the metal sheath 12, and the insulation powder 13. However, the ion probe according to the comparative example does not include the ceramic capillary 14 and the organic adhesive layer 15, which are included in the ion probe 10 according to the present embodiment illustrated in FIG. 3.

As illustrated in FIG. 4, in the ion probe according to the comparative example, a part of the insulation powder 13 located at the distal end of the metal sheath 12 is exposed, and thus the insulation powder 13 absorbs moisture generated in the combustion chamber CC. Consequently, due to repeated use of the ion probe, the insulation resistance between the metal wire 11 and the metal sheath 12 is reduced, resulting in the reduction in the accuracy of flame detection.

Temporal Change in Output Voltage of Ion Probe According to Comparative Example

Figure 5:
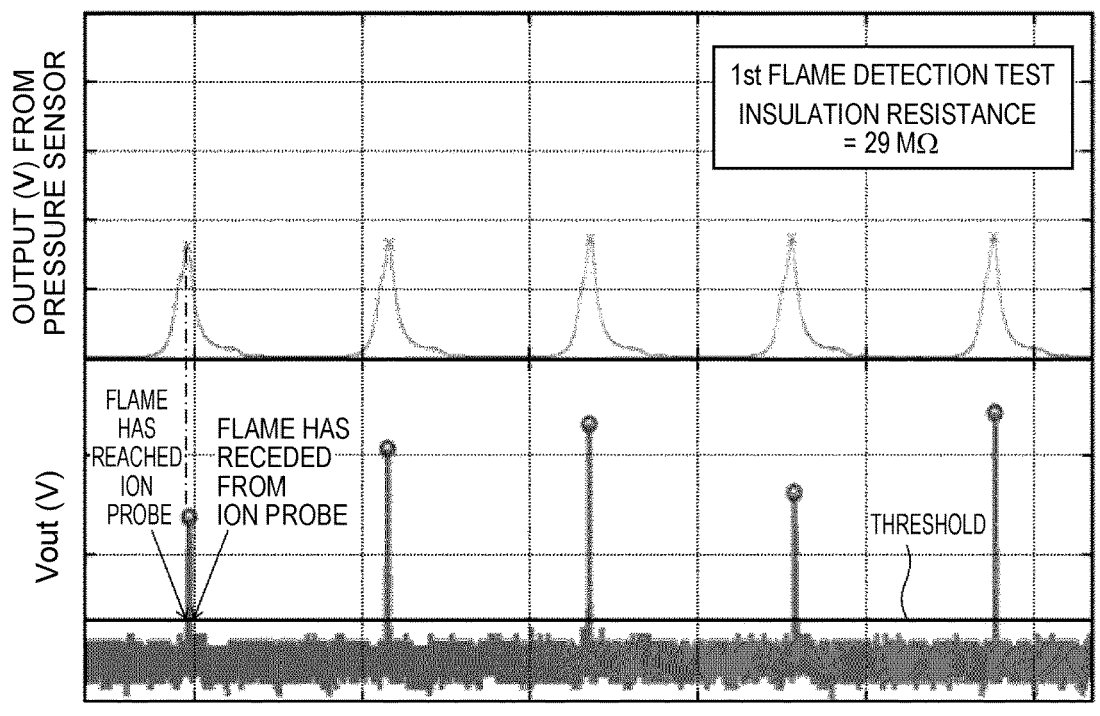
FIG. 5 illustrates graphs indicating a temporal change in an output voltage Vout of the ion probe according to the comparative example.
Figure 5:
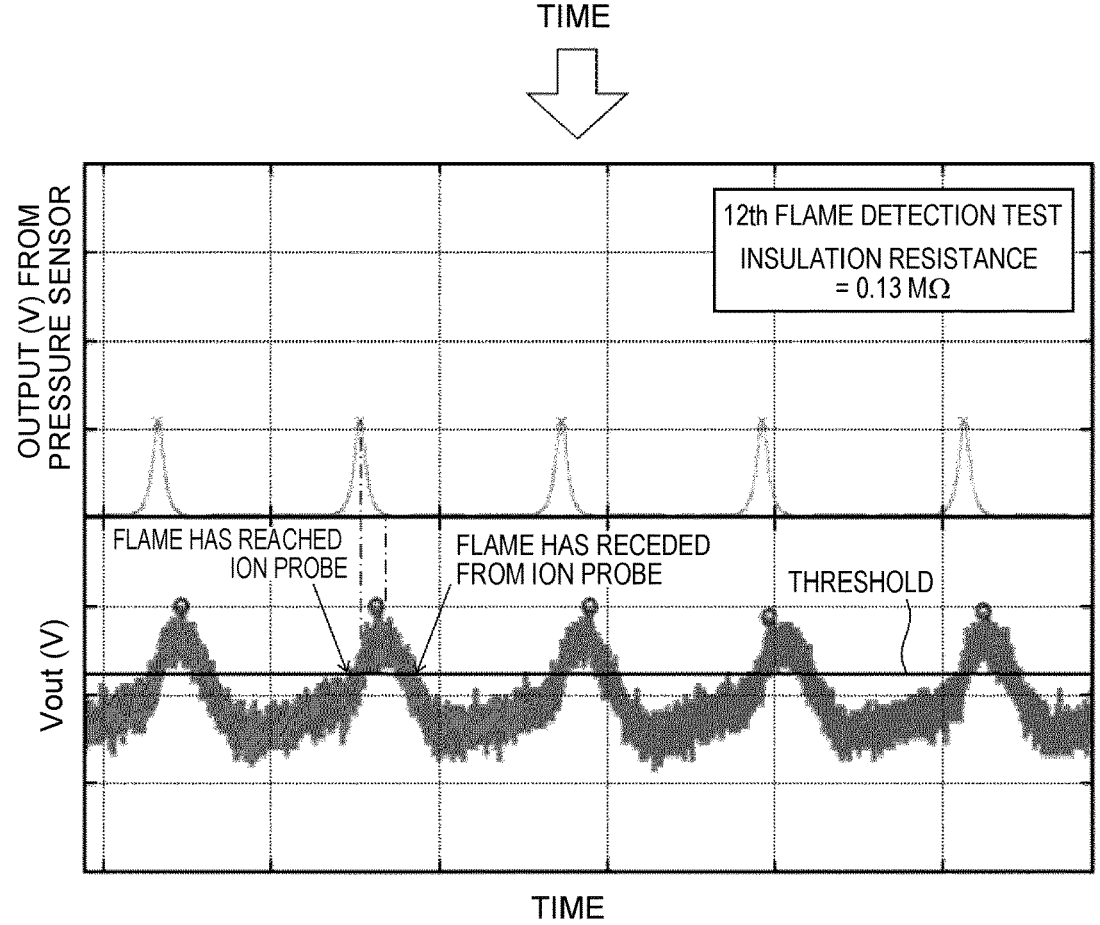

Hereinafter, a temporal change in the output voltage of the ion probe according to the comparative example illustrated in FIG. 4 will be described with reference to FIG. 5. FIG. 5 illustrates graphs indicating a temporal change in the output voltage Vout of the ion probe according to the comparative example. An upper graph indicates a temporal change in the output voltage Vout in a first flame detection test. A lower graph indicates a temporal change in the output voltage Vout in a twelfth flame detection test. In each of the upper and lower graphs, the abscissa axis represents time, and the ordinate axis represents the output voltage Vout and the output from a pressure sensor configured to detect a pressure inside the combustion chamber CC. As illustrated in FIG. 5, setting a threshold for the output voltage Vout of the ion probe makes it possible to determine whether a flame has reached the distal end of the metal wire 11 and to determine whether the flame has receded from the distal end of the metal wire 11. In addition, comparing the upper and lower graphs in FIG. 5 with each other makes it possible to check a temporal change in the output voltage Vout of the ion probe according to the comparative example.

As indicated in the upper graph in FIG. 5, in the first flame detection test, the peaks in the output from the pressure sensor substantially coincided with the peaks in the output voltage Vout. At this time, the insulation resistance between the metal wire 11 and the metal sheath 12 was 29 MΩ.

On the other hand, as indicated in the lower graph in FIG. 5, in the twelfth flame detection test, the width of each peak in the output voltage Vout was greater than that in the first flame detection test, and the peaks were lost in the noise. Therefore, the accuracy of flame detection was obviously lower than that in the upper graph. Specifically, the value of the output voltage Vout was higher than the threshold even after each peak in the output from the pressure sensor. This indicates that the flame did not recede from the distal end of the metal wire 11, so that it was not possible to accurately detect a flame. At this time, the insulation resistance between the metal wire 11 and the metal sheath 12 was reduced to 0.13 MΩ. As described above, in the ion probe according to the comparative example, the insulation resistance between the metal wire 11 and the metal sheath 12 was reduced due to repeated use of the ion probe, so that the accuracy of flame detection was reduced.

Temporal Change in Output Voltage of Ion Probe According to Present Example

Figure 6:
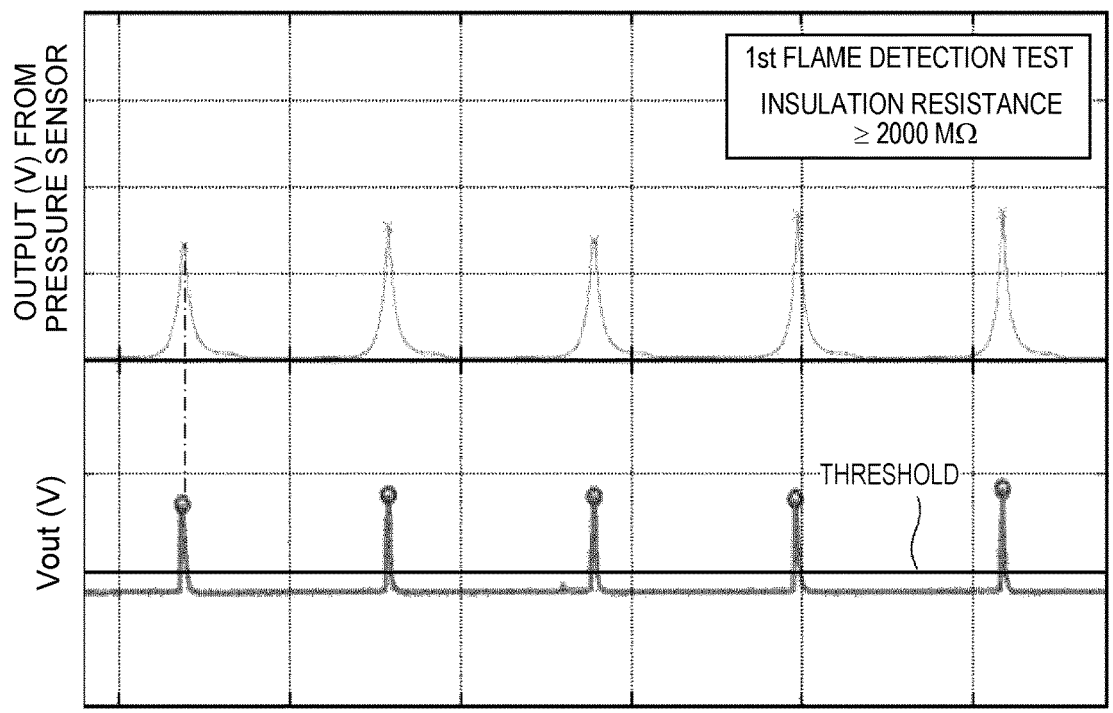
FIG. 6 illustrates graphs indicating a temporal change in an output voltage Vout of an ion probe according to an example of the embodiment.
Figure 6:
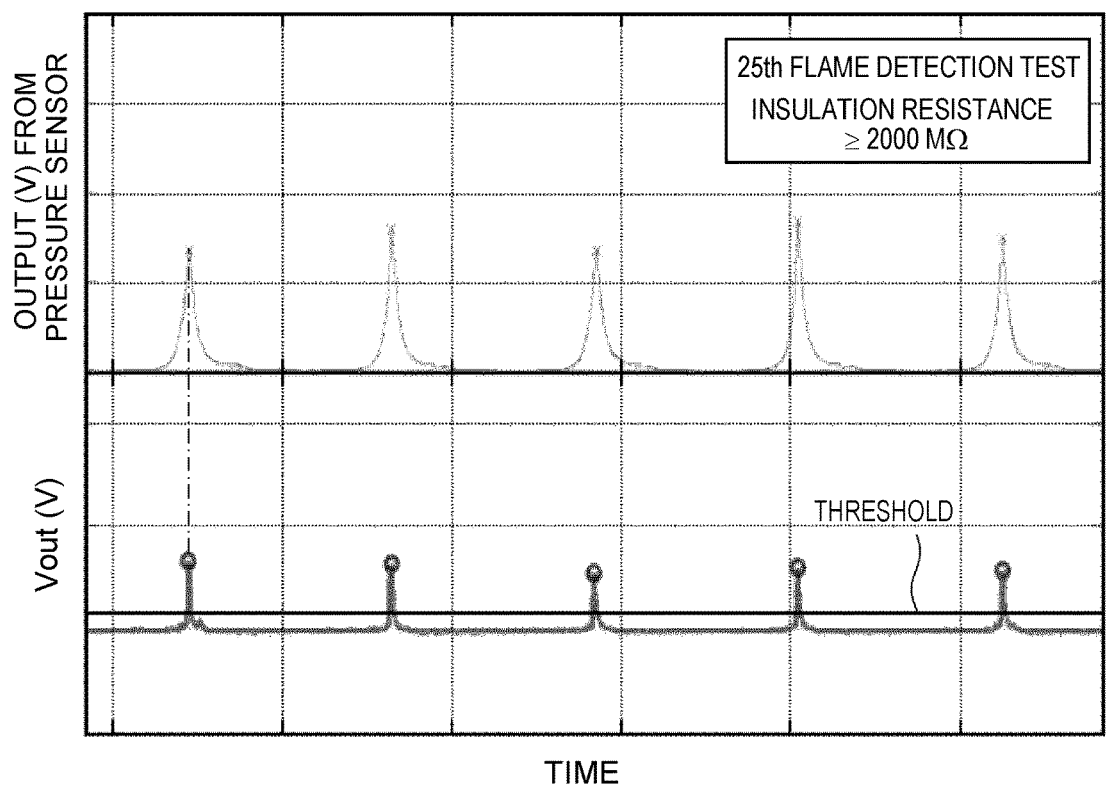

Hereinafter, a temporal change in the output voltage of the ion probe 10 according to an example of the present embodiment illustrated in FIG. 3 (hereinafter, referred to as "present example") will be described with reference to FIG. 6. FIG. 6 illustrates graphs indicating a temporal change in the output voltage Vout of the ion probe 10 according to the present example. An upper graph indicates a temporal change in the output voltage Vout in a first flame detection test. A lower graph indicates a temporal change in the output voltage Vout in a twenty-fifth flame detection test. In each of the upper and lower graphs, the abscissa axis represents time, and the ordinate axis represents the output voltage Vout and the output from a pressure sensor configured to detect a pressure inside the combustion chamber CC. As illustrated in FIG. 6, setting a threshold for the output voltage Vout of the ion probe 10 makes it possible to determine whether a flame has reached the distal end of the metal wire 11 and to determine whether the flame has receded from the distal end of the metal wire 11. In addition, comparing the upper and lower graphs in FIG. 6 with each other makes it possible to check a temporal change in the output voltage Vout of the ion probe 10 according to the present example As indicated in the upper graph in FIG. 6, in the first flame detection test, the peaks in the output from the pressure sensor substantially coincided with the peaks in the output voltage Vout. At this time, the insulation resistance between the metal wire 11 and the metal sheath 12 was equal to or higher than 2000 MΩ, which is a measurement limit. As indicated in the lower graph in FIG. 6, in the twenty-fifth flame detection test as well as in the first flame detection test, the peaks in the output from the pressure sensor substantially coincided with the peaks in the output voltage Vout. At this time, the insulation resistance between the metal wire 11 and the metal sheath 12 was maintained to be equal to or higher than 2000 MΩ, which is the measurement limit.

As described above, in the ion probe 10 according to the present example, it is possible to restrain the reduction in the insulation resistance between the metal wire 11 and the metal sheath 12 due to repeated use of the ion probe 10, thereby restraining the reduction in the accuracy of flame detection.

Figure 7:
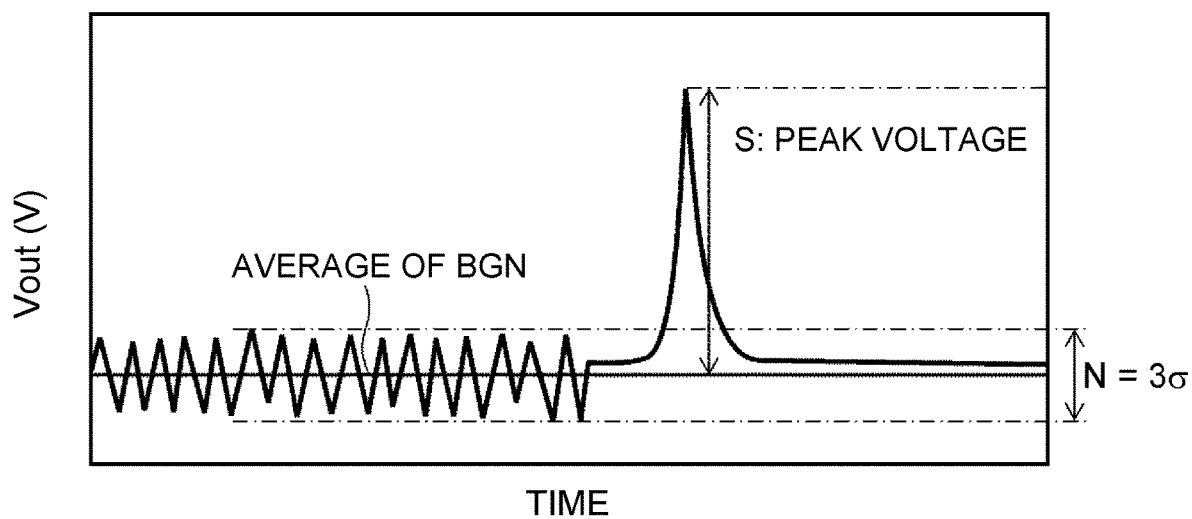
FIG. 7 is a graph indicating the definition of a signal-to-noise (abbreviated as "SN") ratio of each of the ion probe according to the example of the embodiment and the ion probe according to the comparative example.
Figure 8:
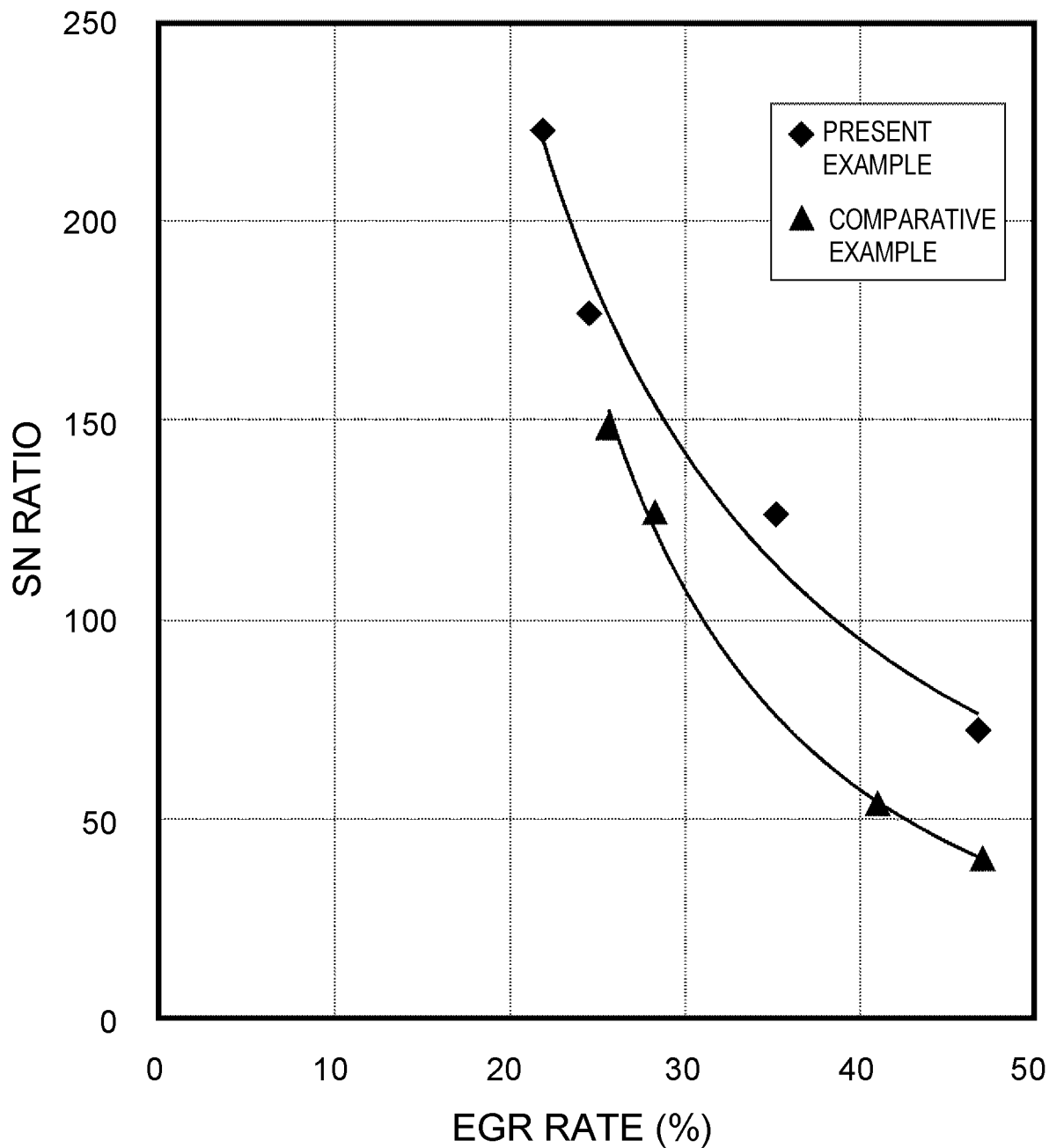
FIG. 8 is a graph indicating a change in the SN ratio of the ion probe according to the example of the embodiment and a change in the SN ratio of the ion probe according to the comparative example, with respect to the exhaust gas recirculation rate.

SN Ratio of Ion Probe According to Present Example and SN Ratio of Ion Probe According to Comparative Example Next, a signal-to-noise (abbreviated as "SN") ratio of the ion probe 10 according to the present example and a SN ratio of the ion probe according to the comparative example will be described with reference to FIG. 7 and FIG. 8. FIG. 7 is a graph indicating the definition of the SN ratio of each of the ion probe 10 according to the present example and the ion probe according to the comparative example. FIG. 8 is a graph indicating a change in the SN ratio of the ion probe 10 according to the present example and a change in the SN ratio of the ion probe according to the comparative example, with respect to the exhaust gas recirculation (abbreviated as "EGR") rate.

First, the definition of the SN ratio of each of the ion probe 10 according to the present example and the ion probe according to the comparative example will be described with reference to FIG. 7. As illustrated in FIG. 7, a peak voltage with respect to an average of the background noise (abbreviated as "BGN") of the output voltage Vout of the ion probe is defined as a signal S. A value obtained by tripling a standard deviation σ of the BGN, that is, 3σ, is defined as noise N.

Next, with reference to FIG. 8, description will be provided on a change in the SN ratio of the ion probe 10 according to the present example and a change in the SN ratio of the ion probe according to the comparative example, with respect to the EGR rate. As illustrated in FIG. 8, at every EGR rate, the SN ratio of the ion probe 10 according to the present example was higher than the SN ratio of the ion probe according to the comparative example, and thus the accuracy of flame detection in the present example was higher than that in the comparative example. As the EGR rate increases, the ion density in a flame is reduced and therefore the peak voltage of the output voltage Vout is reduced and the SN ratio is also reduced.

As illustrated in FIG. 5, in the ion probe according to the comparative example, even in the first flame detection test, the insulation resistance between the metal wire 11 and the metal sheath 12 was 29 MΩ. In contrast to this, as illustrated in FIG. 6, in the ion probe 10 according to the present example, the insulation resistance between the metal wire 11 and the metal sheath 12 was equal to or higher than 2000 MΩ. As described above, the ion probe 10 according to the present example has a higher insulation resistance than that of the ion probe according to the comparative example. Therefore, it can be considered that the SN ratio of the ion probe 10 according to the present example is higher than that of the ion probe according to the comparative example.

The disclosure is not limited to the foregoing embodiment, and various changes and modifications may be made to the foregoing embodiment as appropriate within the technical scope of the disclosure.

What is claimed is:

1. An ion probe comprising:
   a metal wire;
   a metal sheath covering the metal wire;
   insulation powder provided between the metal wire and the metal sheath; and
   a ceramic capillary through which a portion of the metal wire is passed, the portion of the metal wire projecting from a distal end of the metal sheath, wherein
   the ceramic capillary is bonded to the distal end of the metal sheath by an organic adhesive layer, and
   a part of the insulation powder located at the distal end of the metal sheath is covered with the organic adhesive layer.

2. The ion probe according to claim 1, wherein an outer diameter of the ceramic capillary and an outer diameter of the metal sheath are equal to each other.

3. The ion probe according to claim 1, wherein the insulation powder contains magnesium oxide powder.

4. The ion probe according to claim 1, wherein:
   the portion of the metal wire projecting from the distal end of the metal sheath is passed through a through-hole of the ceramic capillary;
   the through-hole has an increased-diameter portion having a diameter that is increased toward a butt surface of the ceramic capillary, the butt surface butting against the distal end of the metal sheath; and the organic adhesive layer is disposed in the increased diameter portion.

\* \* \* \* \*